(No Model.)

J. CHAUMONT.
PATTY PAN.

No. 312,189. Patented Feb. 10, 1885.

Witnesses
Wm A Skinkle
Geo W. Breck

Inventor
Jules Chaumont,
By his Attorneys
Pope & Edgecomb

United States Patent Office.

JULES CHAUMONT, OF WOOD HAVEN, ASSIGNOR TO THE LALANCE & GROSJEAN MANUFACTURING COMPANY, OF NEW YORK, N. Y.

PATTY-PAN.

SPECIFICATION forming part of Letters Patent No. 312,189, dated February 10, 1885.

Application filed October 4, 1884. (No model.)

*To all whom it may concern:*

Be it known that I, JULES CHAUMONT, a citizen of the United States, residing at Wood Haven, in the county of Queens and State of New York, have invented certain new and useful Improvements in Patty-Pans, of which the following is a specification.

My invention relates to the class of culinary utensils employed for baking small cakes or muffins. Such utensils usually consist of a group of small pans inserted and held together in a suitable plate or frame. Various forms of joints have been adopted for the purpose of securing the pans rigidly to each other in such a manner as to have the upper surface free from openings in which the dough can collect. Heretofore, however, it has been difficult to construct such a patty-pan in an economical manner and without a waste of material.

The object of my invention is to so construct a patty-pan that the upper surface shall be free from joints and entirely smooth, except for the depressions made for receiving the cakes, and thus entirely free from the objectionable features usually found in patty-pans, and also to accomplish this without wasting the metal of which the pans are formed.

In constructing the patty-pans each separate pan is struck out from a square rectangular or polygonal blank. To give strength the adjacent edges of the square rectangular or polygonal flange are received by and locked into suitable braces or strips extending along and underneath the edges of the individual pans. If desired, these blanks may be formed into a cluster patty-pan by simply having their adjacent edges turned downward and interlocked with each other. The pans referred to are preferably of circular, oval, or other rounded form that can be stamped out of a polygonal sheet of metal, the projecting edges of which, being integral with the pan, are afterward used to support and unite the same into clusters containing any desired number of depressions, and at the same time to close the gaps or openings that would otherwise exist in a cluster of pans of any rectangular form.

It is designed that the entire group of pans shall be enameled in the usual manner, if it is so desired, after they are united to each other.

Figure 1:
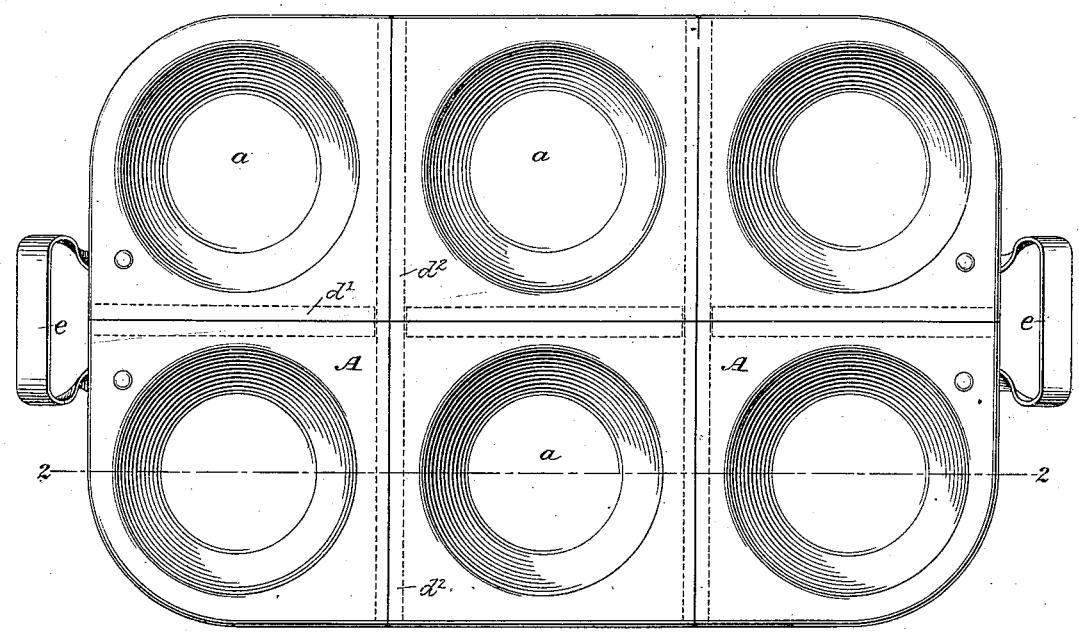
Figure 2:
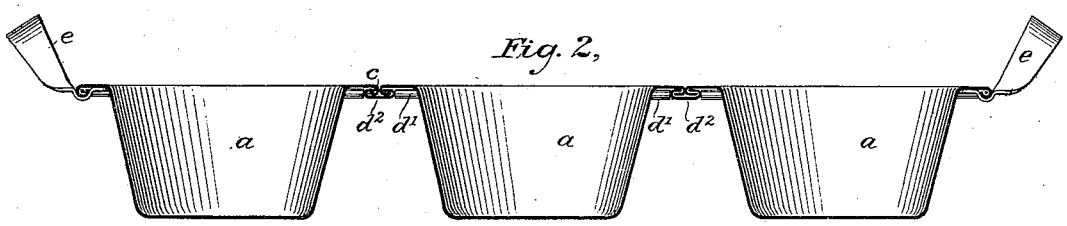
Figure 3:
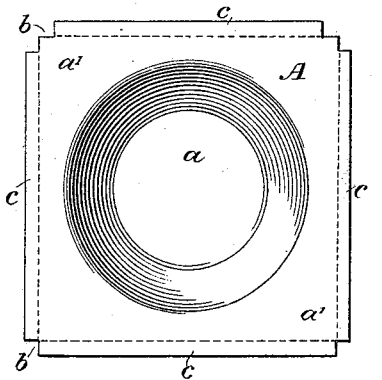
Figure 4:
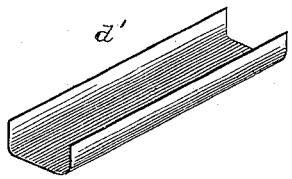

In the accompanying drawings, Figure 1 is a plan view of the patty-pan, and Fig. 2 is a side elevation of the same, partly in section. Fig. 3 shows the form of the pans before they are united together, and Fig. 4 is an end view of one of the uniting-strips.

Referring to the drawings, A represents the piece of metal constituting the individual pan $a$ and its square or polygonal flange $a'$. The corners of the square or polygonal flange $a'$ are cut away, as shown at $b$, for the purpose of turning over the edges $c$. The pans are then grouped together, the edges $c$ being bent downward. The turned edges are inserted into suitable bands or narrow strips, $d'$ and $d^2$, which consist of narrow pieces of metal having their edges bent first upward, then toward each other, as shown in Figs. 2 and 4. The edges $c$ of the square or polygonal flanges of the pans are thus locked together by the corresponding strips, $d^2$. When these are pressed together a strong lap-joint is formed.

In constructing the pan it is preferable that the strips $d^2$ should extend entirely across the pan, while the strips $d'$ are of such length as to extend from one strip $d^2$ to the next strip $d^2$ and at right angles thereto. The strips $d^2$ serve both to unite the pans and to give strength and stiffness to the combined series. The pans may, if desired, be joined together without the strips by the flanges on the pans above, or by any suitable equivalent means. The outer edges of the pans are preferably turned downward, and are caused to lap against or over the corresponding ends of the strips. In this manner the entire upper surface of the cluster patty-pan is made smooth and no openings are left in which the dough may collect. It will be understood that by thus constructing and uniting the pans, there is no waste of metal, no separate or uniting plate being used, the only portion which is not utilized being the very small corners $b$ of the flanges $a'$, which are cut away for the purpose of turning over the edges for interlocking.

The flanges of the corner pans may be rounded, as shown in the drawings, for the purpose of rendering the form of the cluster more convenient, and a stiffening-wire may be carried about the entire edge of the cluster.

I am aware that a series of rectangular bakepans have been connected by the flanged edge of one pan overlapping the unflanged edge of the pan next in line, and I do not claim such construction, or the arrangement of said pans in a single line inclosed by a stiffening-wire.

I claim as my invention—

1. As an article of manufacture, a seamless round or rounded patty-pan having a polygonal flange extending from the edges thereof and integral therewith, said flange being adapted to be joined to other and similar flanges, and thereby to close the spaces between the depressions of a cluster-pan, substantially as set forth.

2. As an article of manufacture, a seamless round or rounded patty-pan having a polygonal flange extending from the edges thereof and integral therewith, the edges of said flange being turned and adapted to be joined to other and similar flanges, and thereby to close the spaces between the depressions of a cluster-pan, substantially as set forth.

3. As a new article of manufacture, a cluster of patty-pans, $a$, each having the square rectangular or polygonal flange $a'$, said flanges being united with the flanges of the adjoining pans at the edges of said flanges and on two of the sides of the corner pans, and on three or more sides of those in the interior of the cluster, substantially as described.

4. A patty-pan consisting of a group of pans having square rectangular or polygonal flanges and separate flanged strips interlocking with the edges of said flanges, and by means of which they are joined together, substantially as described.

5. A patty-pan consisting of the individual pans struck from rectangular blanks A, and having locking-edges $c$ and the strips $d'$ and $d^2$.

In testimony whereof I have hereunto subscribed my name this 1st day of October, A. D. 1884.

JULES CHAUMONT.

Witnesses:
    CHAS. DOUGHTY,
    JAMES COCHRAN.